Figure 1:
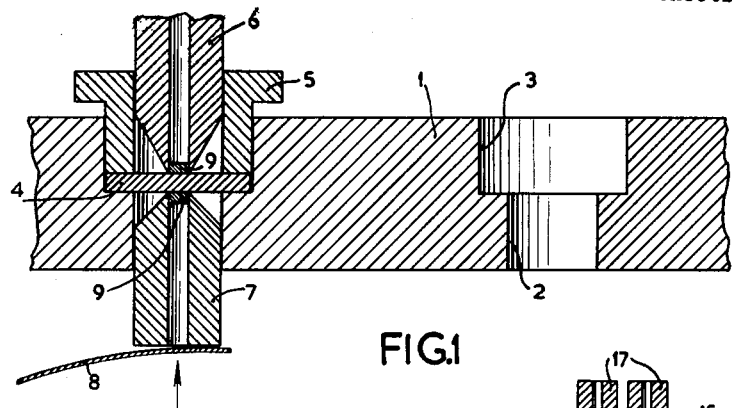

May 8, 1962

J. J. J. FASTRÉ ET AL 3,032,862

METHOD FOR PRODUCING SEMI-CONDUCTIVE ELECTRODE SYSTEMS

Filed July 24, 1958

2 Sheets-Sheet 1

INVENTOR
J.J.J. FASTRÉ
T. J. P. NEUHUYS

BY Frank R Trifari
AGENT

May 8, 1962 J. J. J. FASTRÉ ET AL 3,032,862
METHOD FOR PRODUCING SEMI-CONDUCTIVE ELECTRODE SYSTEMS
Filed July 24, 1958 2 Sheets-Sheet 2

INVENTOR
J. J. J. FASTRÉ
T. J. P. NEUHUYS
BY
AGENT

3,032,862
METHOD FOR PRODUCING SEMI-CONDUCTIVE ELECTRODE SYSTEMS

Joseph Jules Jacques Fastre, Evere, Brussels, and Thierry Jean Paul Neuhuys, Brussels, Belgium, assignors to North American Philips Company, Inc., New York, N.Y., a corporation of Delaware
Filed July 24, 1958, Ser. No. 750,776
Claims priority, application Belgium Aug. 1, 1957
4 Claims. (Cl. 29—155.55)

The present invention relates to methods and devices for producing semi-conductive electrode systems such as, for example, transistors, photo-diodes or crystal diodes in which at least one small quantity of electrode material is fused onto a semi-conductive member and maintained in position by means of a jig.

It is customary to provide the jig with one or more bores into which the electrode material—usually a metal or an alloy—is introduced in the form of a spherule and sealed on, if desired with the aid of a stamper.

This method suffers from a limitation in that the quantities of electrode material are often small so that the spherules are difficult to handle.

A further disadvantage is that, if a jig covers the whole surface of the semi-conductive member and the fused-on electrode covers only a small part of this surface, there is a risk that some space, into which the electrode material may penetrate, is left between the edge of the bore and the semi-conductive member.

In accordance with the invention, which has inter alia for its object to meet these disadvantages, a quantity of electrode material is pressed into the end of at least one punch and together with this punch disposed in a jig against the semi-conductive member, whereupon the material is fused on. As a rule, the punch is subsequently removed.

It is known to prevent the electrode material from flowing out by means of a ceramic tube surrounding the alloy to be fused on.

Further it is known to fuse onto a semi-conductor member a metal tube filled with electrode material throughout its length.

Over these known methods, the method according to the invention has the advantage that the quantity of material to be fused on can be controlled very accurately, as appears from the following.

In general, the material of which the punches consist may be the same as that from which the jigs are made. Preferably, they are made from steel, for example stainless steel, as is known per se from British patent specification 751,143, in particular from chrome-iron.

Punches made from these materials can be processed with a high degree of accuracy, they are little subject to wear and can be disposed very accurately in the desired position against the semi-conductive member.

In general, the punches will consist, in the manner usually employed for such articles, of a tube which is externally tapered at one end to form a sharp edge.

In general, the electrode material will be introduced into the punch by pressing the punch through a thin plate or layer of this material. In this case, the quantity depends exclusively upon the thickness of this plate and the diameter of the punch. These factors can be accurately determined. In one form, the punches, in particular when consisting of brittle material for example, Alundum, such as ceramic material, may have a flat edge, the electrode material then being punched out by placing it on a spherical support.

In general, the upper end of the punch will be open, but this is not absolutely necessary. In the first-mentioned case, a junction wire may be introduced into the punch prior to or in fusing on the electrode material, this wire then being fused to the material in one and the same operation. In this case, the usual and difficult fusing of the electrode wire to the solidified electrodes is superfluous.

Figure 2:
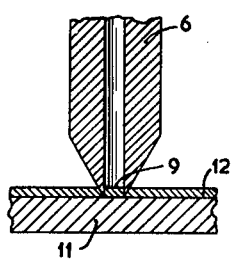
Figure 3:
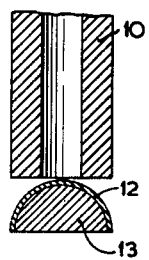
Figure 4:
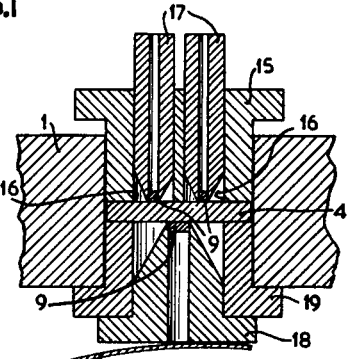
Figure 5:
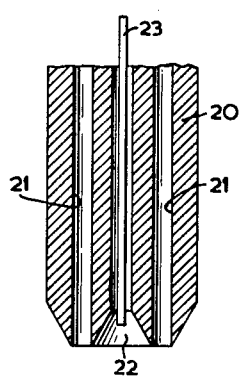
Figure 7:
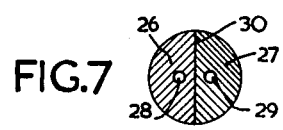
Figure 6:
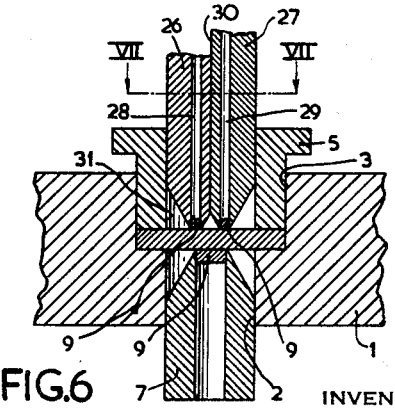
Figure 8:
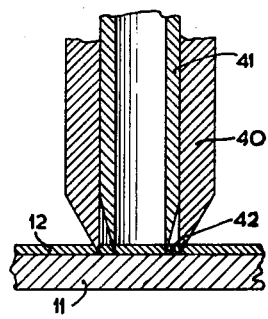
Figure 9:
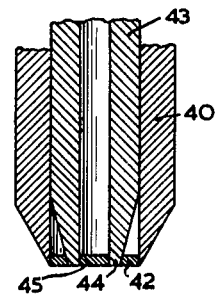
Figure 10:
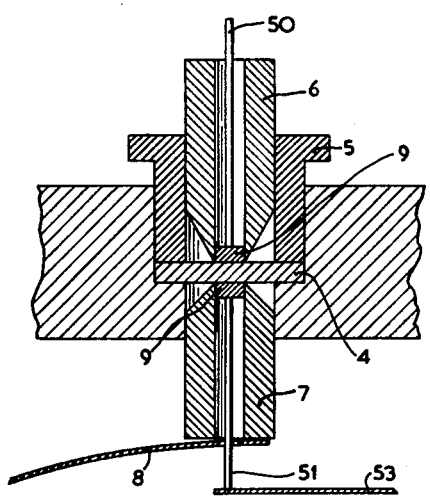
Figure 11:
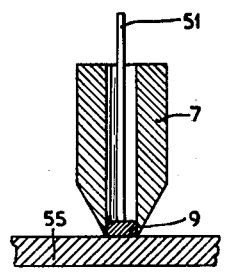

In order that the invention may be readily carried into effect, examples will now be described in detail with reference to the accompanying drawings, in which FIG. 1 is a sectional view of the device according to the invention, FIGS. 2 and 3 illustrate how the punches are filled, FIGS. 4 to 6, 8 and 9 show variants of the device, likewise in sectional view, FIG. 7 is a sectional view on the line VII—VII of FIG. 6, and FIGS. 10 and 11 illustrate how an electrode-wire is fused on.

The device shown in FIG. 1 comprises a plate 1, preferably consisting of metal, in particular stainless steel, such as chrome iron containing 25% of chromium, which is oxidised at its surface, provided with a number of bores having a narrow part 2 and a wider part 3. Into such a bore, a semi-conductive member 4, for example a slice of germanium, may be pressed which is maintained in position by means of a stamper or weight 5 made from the same kind of steel. In this case, the device uses for each semi-conductive member two punches 6, 7 of stainless steel, the first of which bears by its own weight on the semi-conductive member, while the second is pressed against it by means of a spring 8. Oxidized chrome iron containing 25% chromium is very suitable. A quantity of electrode material 9, for example indium, is introduced into the end of the punches, which may be effected in a simple manner as shown in FIG. 2, by pressing such a punch into a plate 12 which consists of said material and is disposed on a substratum 11. The material 9 remains clamped in the punch. The diameter of the bore of such a punch depends of course on the diameter of the electrode to be made; it might be of the order of 500μ. The punches consist of a tapered tube in the usual manner. If the material of the punches is brittle, so that it is difficult to provide them with a sharp edge of sufficient strength, it is possible to use a punch 10 with a flat base, as shown in FIG. 3. Such a punch can be filled with electrode material when using a spherical support 13 onto which a plate 12 of electrode material is pressed.

After positioning the semi-conductive members and the punches the plate 1 is introduced into an oven and subjected to the usual heat treatment for alloying on the electrodes. This treatment might be carried out at about 500° C. in an atmosphere of hydrogen.

The electrode system shown in the drawing may, for example, be fused as a transistor. Of course, it is alternatively possible to fuse on only one electrode in this manner or to fuse on more than one electrode at one side of the semi-conductive member.

If two electrodes have to be provided adjacent each other it is sufficient to provide the plate 1 or the punch 5 with the required bores, as shown in FIG. 4. The plate 1 has a bore in which the semi-conductive plate 4 is nested. On this plate acts a stamper 15 with two bores 16 containing punches 17, the lower ends of which contain small quantities of electrode material 9. This construction is a variation of that shown in FIG. 1 and has the feature that the bore of the plate 1 has a constant diameter, while the lower punch 18 has an edge on which rests a sleeve 19, which supports the semi-conductive disc 4. In this manner two electrodes are obtained adjacent each other.

This construction may suffer from a limitation in that it is difficult to make the electrode spacing very small.

In this case it is possible to use a punch 20 with two bores 21, as shown in FIG. 5. These two bores have a sharp edge at their lower openings to form a cavity 22 between these edges. If such a punch is pressed into a plate of electrode material, this cavity will also be filled with a certain quantity of the material, which is removable by means of an ejector 23.

These bores may be filled with different materials so that, for example, an emitter- and a collector-electrode can be fused on in one operation. Of course, a punch may be provided with more than two bores.

A further method of providing electrodes closely adjacent each other may consist in providing the punches with a flat side wall and disposing the punches jointly in a holder, as shown in FIG. 6. The construction may substantially correspond to that shown in FIG. 1, but in this case the stamper 5 contains two punches 26, 27 each of a semi-circular cross-section, as shown in FIG. 7. Together they fill the aperture 31 of the part 5 of the jig. The bores 28 and 29 are situated very closely near the limiting surface 30. In the same manner, of course, more than two electrodes may be fused on adjacent one another. This method has the additional advantage that the edge of each punch 26, 27 will accurately adjoin the semi-conductive member 4.

In the same manner concentric electrodes can be fused on. To this end, the punches shown in FIGS. 8 and 9 may be used, namely a comparatively wide punch 40 containing a slightly smaller punch 41. In this manner, a ring 42 is punched from a plate of electrode material 12, which ring remains clamped in the punch 40 after removing the punch 41. A punch 43 having a slightly flattened end 44 is subsequently substituted for the punch 41 (FIG. 9). The punch 43 contains electrode material 45 which may be different from the material 32. This material can be introduced into the punch 43 in the manner shown in FIG. 3. The assembly shown in FIG. 6 may be introduced into the device shown in FIG. 1 instead of using the punch 6 or 7.

It is customary to connect the electrode or junction conductors to the electrodes after the fusing proper of the electrodes. This method, which is difficult because the electrodes have a small size and flowing out of the electrode beyond its initial outline should be prevented, can be avoided by introducing the electrode conductors into the punch prior to the fusing operation, as shown in FIG. 10. The construction as shown substantially corresponds to that represented in FIG. 1. The bore of the punch 6 contains a thin electrode wire 50, for example of gold. The bore of the punch 7 contains a similar wire 51. For this purpose the spring 8 is provided with an aperture 52, while the wide 51 is supported by means of a spring 53.

In many cases the last-mentioned spring will be superfluous. If the wire 51 is sufficiently light, it is namely possible provisionally to seal this wire to the electrode material 9, the jig then being inverted so that the punch 7 is up. After subsequently inverting the jig and fusing on the two electrodes, the surface tension of the molten material will be capable of holding the wire 51. As an alternative, this wire may be fused to the material 9 after punching but prior to introducing the punch into the jig. To this end, for example, the punch is rested on a plate of graphite 55 and heated until the wire fuses to said material 9 as shown in FIG. 11.

What is claimed is:

1. A method of making an electrode connection to a semi-conductive body, comprising urging the hollow end of a relatively large punch against and through a plate-like member of electrode-forming material thereby securing in the opening of the punch end a relatively small quantity of said electrode-forming material, placing the punch with its secured electrode-forming material within a jig supporting a semi-conductive body so that the surface of the semi-conductive body is engaged by the electrode-forming material secured in the punch, and heating the body, punch and material at a temperature at which the electrode-forming material fuses to the semi-conductive body in the presence of said punch to form the electrode connection.

2. A method as set forth in claim 1 wherein a wire is introduced into the punch to engage the electrode-forming material prior to the fusion step.

3. A method as set forth in claim 2 wherein the wire is fused to the electrode-forming material before the latter is fused to the semi-conductive body.

4. A method of making a pair of electrode connections to a semiconductive body, comprising urging each of the sharp, hollow ends of a pair of relatively large punches against and through plate-like members of electrode-forming material thereby securing in each opening of each punch end a quantity of said electrode-forming material, placing both of the punches each with its own secured electrode-forming material within a common jig supporting a semi-conductive body so that spaced surface portions of the semiconductive body are each engaged by the electrode-forming material secured in each punch, and heating the body, punches and material at a temperature at which the electrode-forming material fuses to the semi-conductive body in the presence of both punches to form the pair of electrode connections.

References Cited in the file of this patent

UNITED STATES PATENTS

| | | |
|---|---|---|
| 1,048,842 | Lund | Dec. 31, 1912 |
| 2,332,595 | Paquette | Oct. 26, 1943 |
| 2,545,237 | Maby | Mar. 13, 1951 |
| 2,739,369 | Cooney | Mar. 27, 1956 |
| 2,898,668 | Knott et al. | Aug. 11, 1959 |
| 2,913,642 | Jenny | Nov. 17, 1959 |

FOREIGN PATENTS

| | | |
|---|---|---|
| 782,035 | Great Britain | Aug. 28, 1957 |

UNITED STATES PATENT OFFICE

CERTIFICATE OF CORRECTION

Patent No. 3,032,862  May 8, 1962

Joseph Jules Jacques Fastre et al.

It is hereby certified that error appears in the above numbered patent requiring correction and that the said Letters Patent should read as corrected below.

Column 1, line 11, strike out "and devices"; column 2, line 31, before "chromium" insert -- of --; column 3, line 52, for "wide" read -- wire --.

Signed and sealed this 19th day of March 1963.

(SEAL)
Attest:

ESTON G. JOHNSON
Attesting Officer

DAVID L. LADD
Commissioner of Patents